Feb. 4, 1964 K. PFLEIDERER ETAL 3,120,275
ROTOR CONSTRUCTION
Filed March 16, 1962
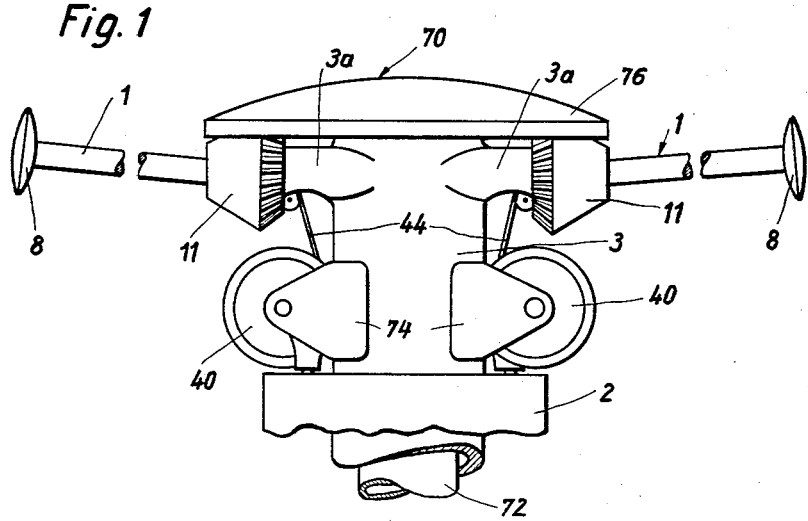
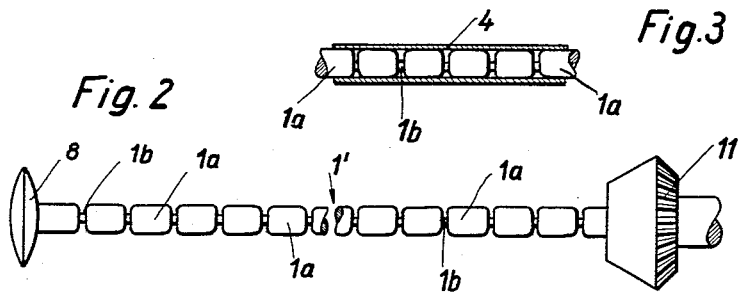
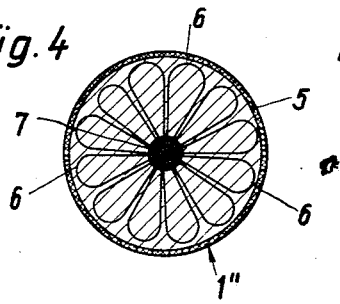
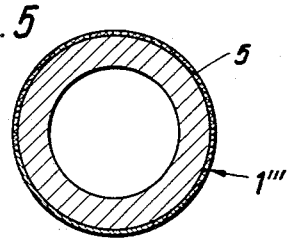
Inventors.
KURT PFLEIDERER
EMIL WEILAND
BY: McGlew and Toren
ATTORNEYS

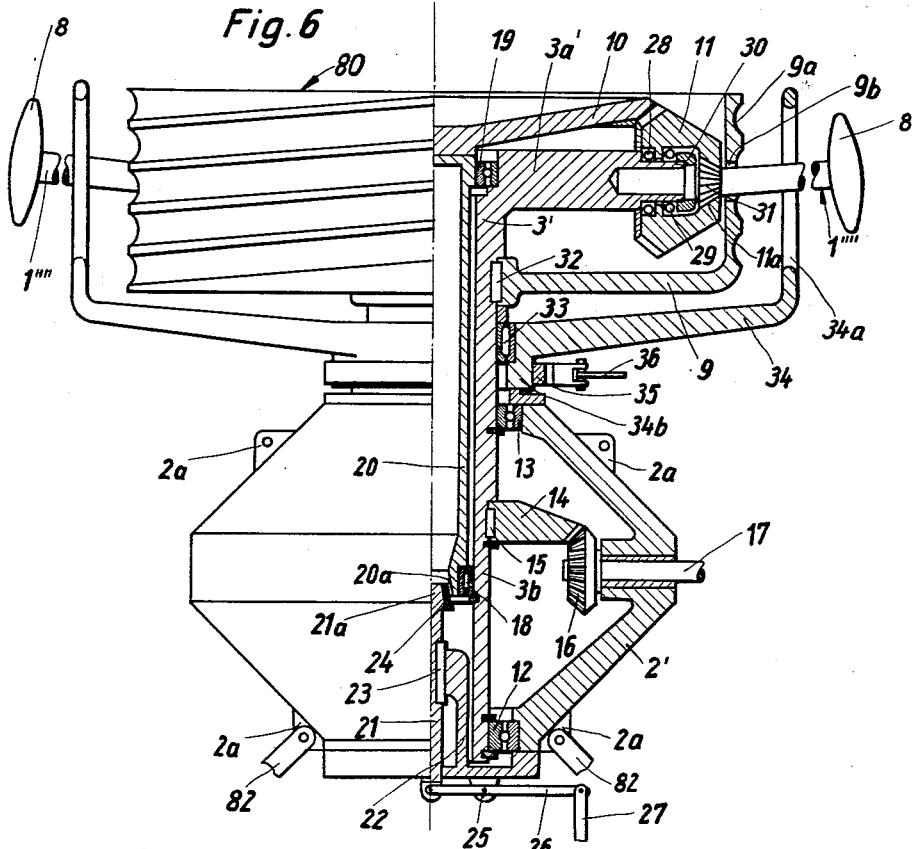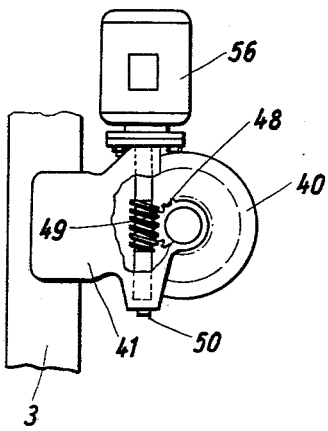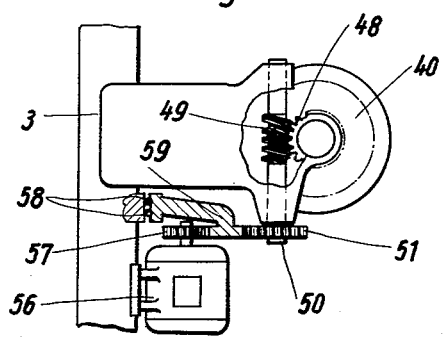

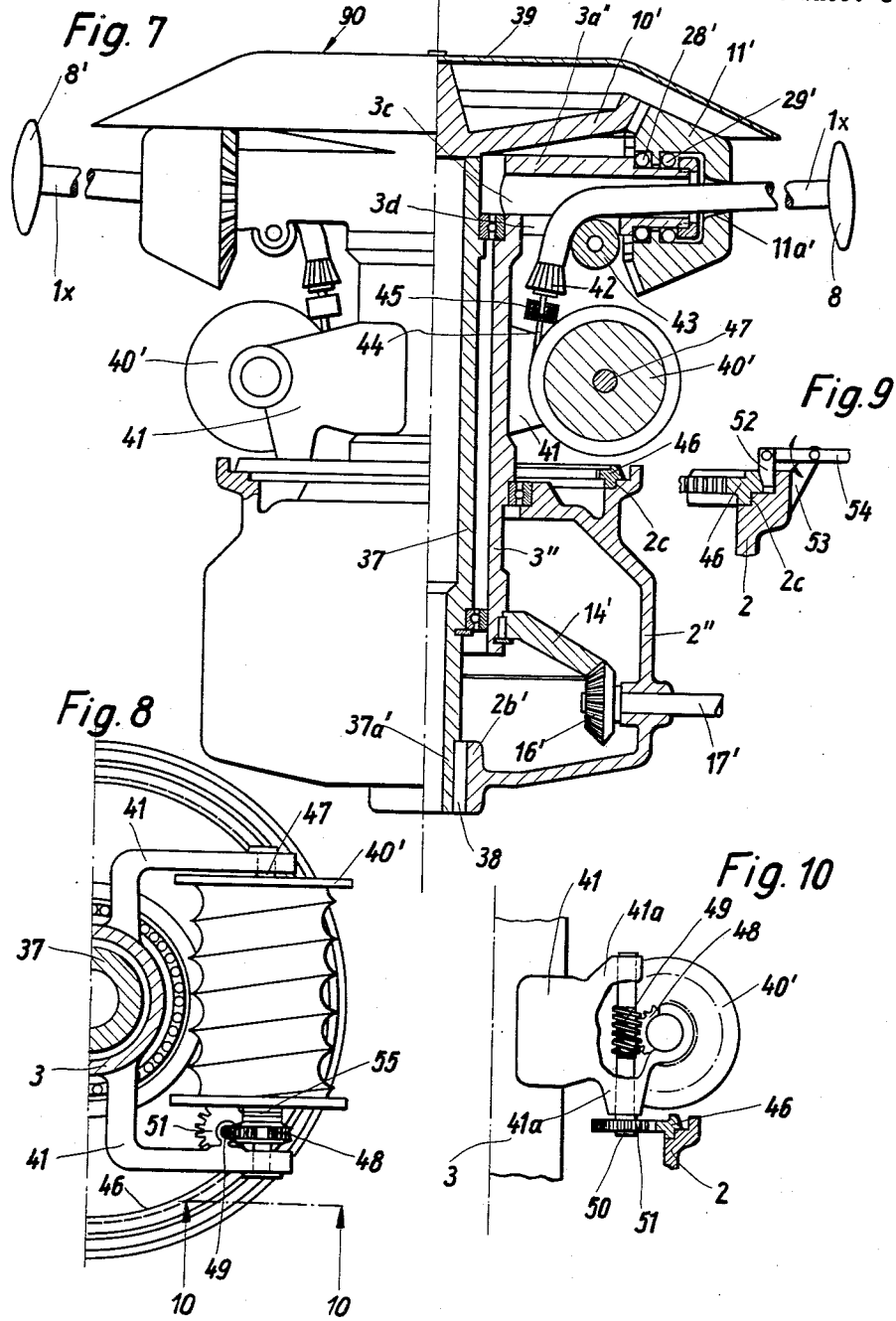

United States Patent Office 3,120,275
Patented Feb. 4, 1964

3,120,275
ROTOR CONSTRUCTION
Kurt Pfleiderer, Munich, and Emil Weiland, Ottobrunn, near Munich, Germany, assignors to Bölkow-Entwicklungen Kommanditgesellschaft, Ottobrunn, near Munich, Germany
Filed Mar. 16, 1962, Ser. No. 180,263
Claims priority, application Germany Mar. 18, 1961
43 Claims. (Cl. 170—160.11)

This invention relates in general to aircraft construction and in particular to a new and useful rotor head for vertical flight for use in an aircraft having additional means for horizontal flight, to an improved rotor element construction, and to means for rotating the rotor elements and for permitting the extension and retraction of the rotor elements on the head.

The present invention is particularly applicable to the type of aircraft which includes propulsion means for sustaining horizontal flight along with wing surfaces and propulsion means for horizontal flight and to an improved helicopter rotor construction therefor for effecting rapid vertical ascent and descent such as during taking off and landing. The present invention is particularly directed to an aircraft of a type employing rotor elements which operate in accordance with the so-called "magnus effect" or which are referred to herein as "magnus rotors." Magnus rotors include rotor elements or blades which are substantially cylindrical and which are rotated about their longitudinal axes as well as rotated about a central rotor head axis.

The present invention is particularly adaptable for aircraft which are known as "convertiplanes." The rotor constructed in accordance with the invention may be used as an auxiliary rotor for such craft and for helicopters with a fixed wing having a rotor which is actuated only during landing, hovering and descent. With such craft, after actuation of the rotor unit during the landing and ascent, a forward driving unit is actuated, and after reaching a flying velocity sufficient to sustain the aircraft, the rotor is cut out and retracted into the fuselage or body or into an external jacket or portion of the fuselage provided therefor.

In accordance with the present invention there is provided a rotor construction which includes individual rotor elements or blades made of a material or constructed so that they bend in a "bending-slack" manner rather than in a "bending-rigid" manner. The rotor elements are retractable into the rotor head and means are provided to permit winding of the elements around the head.

Prior to the present invention difficulties have been encountered with aircraft of this character in respect to the torsional moments acting on the rotor blades due to centrifugal forces which tend to twist or rotate the blade profile backwardly in the rotational plane. Since rotor blades which are made from the bending elastic material by necessity are also torsionally elastic, consideration has to be taken of the adjusting angle of the profile of the elements from the rotor rotational axis which rapidly decreases and is practically zero at the blade tip. In addition, bending elastic rotor blades have a disadvantage that a faithful reproduction of the profile can only be obtained with considerable difficulty. With great flying speeds air streams from the retreating blades act unfavorably on the flying attitude of the aircraft during the retraction of the blade elements and the deactivation of the rotation thereof.

In accordance with the present invention there is provided an improved rotor assembly and operating mechanism as well as improved rotor assembly and operating mechanism as well as improved blade elements which include means for effecting the extension and the retraction of the rotor blade elements, their rotation about the rotor central axis and the rotation of each of the elements about their own longitudinal axis. Means are provided in a relatively small space and with few constructional elements to effect operation of the rotor at the times desired and to permit the attaining of flying speed in a horizontal plane when the rotor is not used. Means are also provided for effecting the rapid transition between an operative condition of the parts of the rotor assembly and a non-operative condition. The mechanism provides means for rapidly discontinuing the rotation of the blade elements and for withdrawing them onto a winding drum element in a rapid manner to permit changeover from vertical to horizontal flight condition with a minimum effect on the operation of the aircraft. The construction is such that the magnus rotor elements are retracted without causing any tearing phenomenon which was apt to occur in prior art constructions after high flying speeds had been obtained. The construction is such that the rotor elements may be completely removed from the air stream and become totally ineffective in respect to their influence on the attitude and flight characteristics of the aircraft.

An important feature of the present invention is that the individual magnus rotors or elements may be inexpensively produced and they provide a highly effective blade element giving satisfactory lift characteristics, permitting their easy retraction with a minimum of adverse influence on the attitude of the aircraft.

In accordance with one embodiment of the invention the rotor elements are made in a solid cylinder of a material which has "bending-slack" characteristics. However, in another embodiment the rotor elements are made up of a plurality of individual rigid cylinders interconnected for rotational movement about a longitudinal axis in unison but permitting the bending thereof for retracting and winding purposes. The rotors advantageously carry at their outer ends a weight which is streamlined and arranged to aid in creating the necessary centrifugal force for the operation of the rotors and the maintenance of the rotors in a correct vertical flight control attitude.

In a still further embodiment the rotor elements include a central flexible wire or rope core covered with an elastic material which may advantageously be reinforced by looped elements extending radially from the wire core and connected thereto.

An object of the invention is to provide an improved helicopter rotor construction.

A further object of the invention is to provide a helicopter rotor construction including a plurality of bendable blade elements which are adapted to be wound on central drum means in an inoperative position, or permitted to be moved outwardly under centrifugal force for operation thereof.

A further object of the invention is to provide a rotor assembly which includes means for rotatably and revolvably carrying a plurality of blade elements of a bendable material and further including means for winding the elements inwardly into a central location to an inoperative position.

A further object of the invention is to provide a helicopter rotor for magnus rotor elements including a central rotor portion having drum means for winding the blade elements thereon and including driving gear elements for rotating the central rotor member with the blade elements and for rotating each blade element about its own longitudinal axis, and including means for discontinuing the rotation of each of the blade elements.

A further object of the invention is to provide a rotor construction which includes a central drum member rotatable about a vertical axis and carrying a plurality of magnus blade elements, gear means for rotating each of said blade elements about its own longitudinal axis and for rotating said drum element, means for selectively disconnecting the blade elements from rotational movement and for effecting winding or unwinding of the blade elements onto and off the central drum member.

A further object of the invention is to provide a helicopter magnus rotor assembly which includes a central rotor element carrying a plurality of magnus rotors, means for rotating the central elements with said rotors and for rotating each of said rotors about their own longitudinal axis, with a winding drum associated with each of said elements and rotatable about a horizontal axis having means for actuating the winding drum for effecting extension and for effecting retraction of said blade elements, and means for selectively regulating rotation of the rotor member and the rotation of each of the blade elements.

A further object of the invention is to provide a helicopter rotor construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a fragmentary side elevation of a rotor for a "convertaplane" having magnus rotors or elements and constructed in accordance with the invention;

FIG. 2 is a partial side elevation of a magnus rotor constructed in accordance with the invention;

FIG. 3 indicates a magnus rotor similar to that indicated in FIG. 2 but with an elastic cover thereover;

FIG. 4 is an enlarged transverse section through a magnus rotor of another embodiment of the invention;

FIG. 5 is a view similar to FIG. 4 of still another embodiment of the magnus rotor;

FIG. 6 is a side elevation partly in section of a rotor head assembly with winding and driving means for the magnus rotor constructed in accordance with the invention;

FIG. 7 is a view similar to FIG. 6 of another embodiment of the invention;

FIG. 8 is a fragmentary top plan view of the retracting and winding mechanism for the magnus rotor of FIG. 7;

FIG. 9 is an enlarged fragmentary section of a portion of the rotor head indicated in FIG. 7;

FIG. 10 is a fragmentary side elevation taken along the lines 10—10 of FIG. 8;

FIG. 11 is a view similar to FIG. 10 of another embodiment of a drive for the retracting and winding device; and FIG. 12 is a view similar to FIGS. 10 and 11 of still another embodiment of a drive for the retracting and winding device.

Referring to the drawings in particular, the invention embodied therein, as indicated in FIG. 1, includes a rotor assembly or rotor head generally designated 70 for a convertaplane which includes a portion 2 which is secured to the plane, and an outer part 3 which rotates in the portion 2 and around a concentric driving rotor shaft 72.

In according with the invention, magnus rotor blades generally designated 1 are employed which are elongated cylindrical members made of a material having "bending-slack" characteristics. The magnus rotors 1 are retractable into the rotor head and are made or constructed in a manner to permit their winding on winding drums 40 rotatably carried on brackets 74 which are affixed to the part 3. The part 3 is rotated by means of a transmission (not shown) driven through the shaft 72, which in turn is operated from a power plant of the aircraft (not shown).

When the rotor head 70 is rotated, the magnus rotors 1 are automatically moved out from the center of rotation. Means are provided to effect rotation of the magnus rotors 1 by means of a bevel gear 11 which is connected to the magnus rotors 1 and driven by an internal gearing carried under a head portion 76 of the rotor 70. Due to the "bending-slack" construction of the magnus rotors it is possible to wind the rotors up on the drums 40 and retract them within the heads 70. When the magnus rotor blade elements 1 are fully extended and rotated, there is produced a thrust by the magnus effect, which thrust corresponds to the thrust produced by a helicopter rotor with a usual blade construction.

A feature of the construction is that the blades are made of a construction and/or material to permit winding around the drum 40 so that no flapping or lagging hinges are necessary as would be required in prior art constructions of this type. Since the rotors are magnus rotors they simply act as drag bodies in non operative condition, and, therefore, critical moments which are otherwise caused in rotor blades as a result of the air flow conditions, are entirely prevented.

In FIG. 1 a rotor head 70 is indicated which includes only two magnus rotor blade elements 1, however, it should be fully appreciated that a number more than two may be included. In such instance the operation of the other rotor elements would be in the same manner as set forth.

In FIG. 2 there is indicated a preferred construction of magnus rotor which consists of a plurality of elements 1a of identical cylindrical construction or circular cross-section which are advantageously made of a solid rigid material. These elements 1a are connected together by intermediate connecting piece 1b in a manner permitting bending thereof, but also effecting a connection between the elements 1a for rotation together about their own axes.

The embodiment indicated in FIG. 2, as compared to single part rotors, provides the advantage that the individual elements of the magnus rotor can be produced of a "bending-stiff" material without the "bending-slack" characteristics of the magnus rotor being influenced. This advantage is assured by the articulated connection of the individual elements 1a by means of the coupling pieces 1b. The individual elements 1a thus connected cannot perform relative rotation relative to each other, however, and they remain longitudinally stable and are only elastic to a very small extent.

In FIG. 3 a modified arrangement is indicated in which a flexible or elastic coating element or cover 4 is arranged to extend over the entire length of the magnus rotor. The covering 4 insures that there will be no gap losses between the individual link elements 1a and permits the obtaining of a larger rotational surface.

In FIG. 1 the magnus rotor 1 is made of a solid cylindrical construction having a circular cross-section in contrast to rotors which are composed of a plurality of links, as indicated in FIG. 2. In order to make the jackets of the magnus rotors 1 of FIG. 1 or the construction indicated 1' in FIG. 2 resistant against weather influences or against contaminants which may be present in the air, there is provided in accordance with the invention, as indicated in FIG. 3, a jacket or a protective fabric reinforcement indicated 5 in FIG. 4. For clarity's sake the rotor in FIG. 1 is indicated 1, that in FIG. 2 is indicated 1', and that indicated in FIGS. 4 and 5 are designated 1'' and 1''', respectively.

Of further importance is the fact that the coating 4 and the fabric coating 5 are connected to blowers (not shown) or compressors (not shown) which produce short air strokes so that the coating may be expanded and contracted for the purpose of reducing ice formation on the rotors, for example.

In the FIG. 4 embodiment the fabric reinforcement 5 provides added stability and permits the use of a very wide rotor at a very high rotational velocity. For this purpose the fabric 5 is such that it will have high resistance to loads but sufficient elasticity, so that it does not prevent the retraction or winding up of the rotors.

In FIG. 4 a further reinforcement consists of a plurality of loop elements 6 which are bound to a central flexible wire cable 7 and extend outwardly in radial directions and are embedded in the material of the magnus rotor 1″. This construction is particularly advantageous to provide a very sturdy rotor construction which will not deform or become elongated during rotation thereof. The rotor construction further includes the provision of streamlined weight elements 8 at the ends which insure that the rotor becomes stretched when it is in an operative position due to the centrifugal forces acting.

In FIG. 5 a hollow rotor construction is indicated 1‴ which is covered with a cover or reinforcement 5.

In FIG. 6 there is indicated a modified construction of a rotor generally designated 80 which includes magnus rotors 1⁗. Rotation of the magnus rotors and their revolution around the rotor hub is sufficient for causing the lifting of an aircraft having a wing (not shown). After sufficient altitude is obtained and forward speed sufficient to sustain flight is achieved, the magnus rotors are windable on a drum 9 which is vertically elongated and rotatable about a vertical axis. The magnus rotors 1⁗ are caused to rotate by a gear transmission which includes a central sun gear or bevel gear 10 which is concentrically secured to the upper end of a rotor axis 20 and includes gear teeth in meshing engagement with gear teeth of a planetary gear 11 provided for each magnus rotor 1⁗ and rotatable on roller bearings 28 and 29 on a flange portion 3a of a rotatable hollow element or sleeve member 3'.

The rotor head 80 is driven through gears carried in a transmission housing 2' which is carried in the aircraft on movable arms 82 which permit the projection of the rotor about the fuselage or its retraction into the fuselage (not shown), as desired. The transmission is rotatable about the member 3' on ball bearings 12 and 13. The drive of the body 3' is caused by means of a bevel gear transmission including a bevel gear member 14 which is keyed to the member 3' by a key 15 and is in meshing engagement with a bevel gear 16 which is affixed to the shaft 17 which is rotatable in a portion of the transmission housing 2'. The shaft 17 is driven by a propulsion device (not shown) of the aircraft.

An inner tube or pipe 20 is rotatably mounted on ball bearings 18 and 19 in the rotational body 3' and it carries at its upper end the central bevel gear 10. In the lower end of the pipe 20 there is formed an interior cone 20a which is adapted to receive a conical part 21a of a braking device carried at the end of a displaceable shaft element 21. The shaft element 21 is concentric to the rotor axis and is arranged in a guide 22 and held against rotation by means of a key 23. The shaft 21 is displaceable axially by means of a lever system 26 and 27 which is mounted for pivotal movement about a block or bracket member 25 carried at the lower end of the element 22. The other end of the lever 26 is pivoted at the lower end of the shaft 21. The conical part 21a of the shaft 21 has a friction coating 24 and this coating is made to bear against the conical end 20a of the sleeve element 20 to brake its rotation when the lever member 27 is pulled downwardly.

The member 3a comprises a plurality of arms corresponding to the number of magnus rotors 1⁗ having ends adapted to receive bearings 28, 29 for the bevel gears 11. A retaining nut 30 holds the bevel gear 11 and the bearings 28, 29 against axial displacement. This nut 30 also permits adjustment of the tooth play between the planetary gear 11 and the sun or bevel gear 10.

A feature of the construction is that the magnus rotors 1⁗ are caused to rotate by the planetary gear by means of a conical coupling piece 31 which is arranged at the inner ends of the magnus rotors and which engages in a similarly arranged conical cut-out 11a of the planetary gear 11. In order to insure that there is a slip-free rotation of the rotors by the planetary wheels 11 the coupling piece 31 is provided at the rotor ends, as is the cut-out 11a, with grooved gearing or spline elements.

An additional securing of the rotors 1⁗ in an axial direction is not necessary, since the rotor head rotates and due to the large centrifugal force which acts on the rotors affected by the weighted elements or disks 8, a very secure connection between the rotors and the planetary wheels 11 is assured.

A drum 9 is provided for winding of the magnus rotors 1⁗ and it is mounted on the member 3' below the arms 3a and secured to the elements 3' by means of key 32. Thus the drum 9 partakes in the rotation of the member 3' and is provided with bores or openings 9d at its surface to permit passing of the magnus blades 1⁗ therethrough. Theads or grooves 9a are defined on the exterior of the drum having a depth and width corresponding to the diameter of the magnus rotors 1⁗ and located in a position to insure the winding up of the rotors on the drum, when desired.

In addition to the drum 9 there is arranged on the rotating member 3' a fork-shaped part or element 34 which is free to be taken along by the rotors 1⁗. The member 34 is rotatable on ball bearings 33 which embrace the member 3'. Rotation of the member 34 may be inhibited or stopped by means of a braking device. The fork-shaped member 34 is arranged on the rotating member 33 in a manner so that the rotors 1⁗ are held between fork-shaped ends 34a thereof. A cylindrical abutment or projection 34b is arranged at the member which carries the ball bearings 33. A braking device including a collar or spring band brake 35 surrounds this abutment 34b and is provided with an actuating rod 36 for tightening this band to slow this rotation of the member 34 for braking purposes. The element 36 is arranged and connected to cooperate with the levers 26 and 27 by means (not shown) in order to insure that the central wheel 10 is stopped in cooperation with the stopping of the member 34. When the central wheel brake for the sun gear 10 is in an operative position (i.e. rotors 1⁗ rotating), the brake device 35, 36 with the fork-shaped member 34 is non-operative (i.e. member 34 turns freely).

The manner of operation of the auxiliary rotor of FIG. 6 is as follows: When the rotor head 80 is at rest, then the magnus rotors 1⁗ are wound on the drum 9. The rotary member 3' of the rotor head is rotated by the shaft 17 via the bevel gears 14 and 16. At this time the braking device 21, 27, which is associated with the central wheel 10, is opened while the brake 35 with the fork-shaped member 34 is actuated. The planetary wheels 11, during rotation of the rotary member 3', do not perform a developing rotary movement over the central gear 10, because the central gear 10 may also rotate.

Before the magnus rotors 1⁗ are rotated they are first wound off the drum 9. For this purpose the brake 35 is opened, so that the fork-shaped part 34 can be taken along by the ends of the magnus rotors which rotate along with the drum 9. Due to the centrifugal forces which act on the individual rotors during their rotation of the head 80, the rotors start to wind off the drum 9 with increasing speed. The centrifugal forces are increased by the relatively heavy terminals or end disks 8. In order to prevent a sudden attainment of the stretch position during a high winding at high speed and perhaps the tearing off of the rotors from the coupling pieces 31 or tearing off of the rotational symmetrical weights 8, the fork-shaped part 34 is braked somewhat by the braking device shortly before attaining the stretch position of the rotors. By braking the part 34 so that it does not rotate relative to the rotation of the drum 9, a delay of the unwinding of the rotors is effected. In the fully stretched out position of the magnus rotors 1'''' the braking device 35 is immediately and entirely opened again so that the fork-shaped part 34 can be easily taken along by the rotors with the rotation of the drum 9.

After release of the brake 35, the central gear 10 is blocked in the lever system 26, 27, and the brake device 21, 24 secured against rotation. When the central bevel gear 10 is at rest and the part 3' is rotating, the planetary wheels 11 permit the relative rotative movement of the drum and the gears 11 carried thereon. During this movement of the drum 9 and the planetary gears 11, the magnus rotors 1'''' are rotated, being coupled to the bevel gears 11 through the couplings 31 and 11a. Rotation of the magnus rotors 1'''' causes a thrust which is similar to that occurring in an ordinary helicopter rotor.

During the retraction of the magnus rotor 1'''' the braking device 21, 24 is first released so that the central bevel gear 10 can be taken along by the planetary wheels 11, and the developing movement of the planetary wheels 11 on the central gear 10 stops to stop the rotation of the magnus rotors 1''''.

In order to wind up the rotors, the brake 35 is thereafter applied lightly via the rod system 36 so that the rotational speed of the fork-shaped member 34 is slightly less than the rotational speed of the drum 9.

As the magnus rotors 1'''' are guided between the fork-shaped part 34a of the part 34, the bending elastic rotors, due to the varying rotational speed between the drum 9 and the part 34, are by necessity wound on the drum 9. After complete retraction of the rotors and with an intended continuous rotation of the part 3', the brake 35 is again somewhat opened in order to prevent a rapid wear, however, only to such an extent that the magnus rotors 1'''' cannot automatically wind off again from the drum 9.

As mentioned previously, the rotor head 80 is mounted on the arms 82 to permit the entire rotor head to be retracted into the head after the magnus rotor elements 1'''' are retracted and wound around the drum 9.

In FIG. 7 another embodiment of the invention is indicated with various similar parts similarly designated but with the use of a prime indication. The magnus rotor, however, is indicated 1x with the weights at the end thereof being indicated 8', for example. In order to distinguish the parts from the previous embodiments, higher prime numbers have been allocated to the various similar parts, for example the rotating element 3' has been designated 3'' and the arm portion thereof has been designated 3a''. The rotor includes a transmission casing 2'' which is secured to the aircraft and which carries the lower end of the rotating part 3'' which rotates relative to the rotor head generally designated 90. The member 3'' is rotated by means of bevel gears 14' and 16' by the drive shaft 17' mounted in the casing 2''. A hollow cylindrical member or pipe 37 is arranged within the member 3'' concentric to the rotor axis and carries at its lower end 37a' a hub 2b' of the transmission housing 2'' and is secured thereto for rotation therewith by means of a key 38.

A bevel gear 10' is carried at the upper end of the member 37 and includes teeth in meshing engagement with planetary wheels 11' which are rotatable on bearings 28' and 29' at the end of arm element 3a''. The driving elements are advantageously covered by a hood 39.

In accordance with the features indicated in FIG. 7, the magnus rotors 1x are retractable into the rotor head and are windable over horizontally disposed drums 40' which are mounted for rotation about horizontally disposed shafts 47, 47, carried on arms 41, 41, held by the rotatable member 3''. The drums 40' are automatically driven after obtaining a flying velocity which is sufficient to cause the maintenance of the craft by the wing structure to retract the elements 1x. The planetary wheels 11 rotate the magnus rotor elements 1x through a releasable coupling which is constructed as a cone coupling. One of the coupling parts 42 has an outer conical configuration formed at the end of the magnus rotors 1x and the other part is an inner cone portion 11a' formed at one end of the planetary wheels 11. Suitable means such as mating groove and projection portions of the various coupling elements may be provided to insure positive interengagement.

In order to be able to retract the magnus rotors 1x the arms 3a'' of the rotary member 3'' have radially directed bores 3c and at their lower side have cut-outs or recesses 3d through which the rotors 1x can be drawn in a direction downwardly and parallel to the rotor axis. In order to prevent a sharp buckling or bending of the rotors 1x, there is provided guide rollers 43 in the regions of the cut-outs 3d. Retraction of the rotor blade elements 1x is achieved by means of ropes or cables 44, one end of which is secured to the drum 40 and the other end of which is secured at the inner end of the rotors by means of a coupling 45. The coupling 45 insures that during rotation of the magnus rotors the rope 44 is not twisted or co-rotated.

The drive of the retraction and winding drums 40' is accomplished by means of a worm gear 49 indicated in FIGS. 8 and 10. The worm gear 49 is coupled with a freely rotatable tooth gear 46 by means of a spur gear 51. The tooth gear 46 is mounted in a guide 2c of a casing 2'' and is concentric to the rotor axis and is freely rotatable. The rotary movement of the tooth gear 46 produced by the spur gear 51 when the magnus rotors are in a moved-out condition can be braked by means of a braking device. As indicated in FIG. 8, the shaft 47 which carries the drum 40' has mounted thereon a worm gear 48 which is in meshing engagement with a worm 49 mounted in bearing eyes 41a at one end of the arms 41 which are disposed parallel to the rotor axis in a vertical arrangement. At the lower end of the worm shaft 50 there is secured a pinion 51 which meshes with the inner gearing of the tooth gear 46.

In a non-braking condition the easily rotatable gear 46 which is mounted in the guide 2c is taken along by the pinion 51. In this condition no drive of the winding drums 40' takes place. Only during braking or fixing of the tooth gear 46 by means of the braking device shown in FIG. 9 does there occur a relative movement or developing movement of the pinion 51 at the inner circumference of the tooth gear 46 and a rotation of the winding drums 40'.

The braking device indicated in FIG. 9 comprises a clamping pawl 52 which is pivoted on a bracket 53 held on the casing 2'' at the counter end of the lever 54 which is advantageously articulated by suitable control means. During the developing movement of the pinion 51 the drum 40' is turned in a winding direction via the worms 49 and the worm gear 48.

In order to be able to exclude any self-blocking action of the worm gear during the winding off of the magnus rotors 1x there is arranged between one of the end surfaces of the drums 40' and the worm gear 48 a shaft coupling 55 which permits the worm gear 48 and the spur gear 51 to become decoupled from the drums 40', so that the wound magnus rotors 1x can be freely wound off the drum by the centrifugal forces acting thereon without driving through the gear transmissions. In the embodiments of FIGS. 7 to 10 no opposing drive of the drums 40' takes place.

The braking device for the gear wheel 46 may be brought automatically into or out of action in dependence on the switching in and switching out of the shaft coupling 55. Advantageously the alternate actuation of the braking device for the gear 46 and the shaft coupling 55 is carried out in a manner so that the shaft coupling 55 first re-establishes the coupling connection with the worm gear 48. The actuation of the tooth gear brake during intended retraction of the magnus rotors 1x is accomplished either automatically or manually. If automatic arrangements are employed it is preferable to have the automatic control influenced by damming pressure.

The actuation of the retracting and winding device indicated in FIGS. 7 to 10 is as follows: When the rotors are moved out between the planetary gears 11 and the magnus rotors 1x, there is established a coupling connection via the coupling pieces 42 at the end of the rotor ends and the corresponding cut-outs 11a' of the planetary wheels 11'. In this coupling position the magnus rotors 1x are caused to rotate. The coupling 45 prevents the rope 44 which is secured to the drums 40' from partaking in the rotational movement of the magnus rotors 1x. During the rotation of the magnus rotors 1x blocking pawl 52 is out of engagement with the gear 46.

If the rotors are to be retracted and wound onto the drum 40', then the connection between the drum 40' and the worm gear 48 is re-established and the gear 46 is braked by the blocking pawl 52 so that its rotation is somewhat less than the rotation of the rotary part 3' and of the drum 40' which is mounted on its arm 41. Due to the relative movement between the gear 46 and the rotary part 3' there is a connection via the coupling pieces 42 at the end of the rotor end and the corresponding cut-out 11a' of the planetary wheels 11'. In this coupling position the magnus rotors 1x are caused to rotate. The coupling 45 prevents the roll 44 which is secured to the drum 40' from partaking in the rotational movement of the magnus rotors 1x. During the rotation of magnus rotors 1x blocking pawl 52 is out of engagement with the gear 46.

If the rotors are to be retracted and wound onto the drum 40', then the connection between the drum 40' and the worm gear 48 is re-established and the gear 46 is braked by the blocking pawl 52 so that its rotation is somewhat less than the rotation of the rotary part 3' and of the drum 40' which is mounted on its arms 41. Due to the relative movement of the gear 46 and the rotary part 3' there is a development movement of the pinion 51 which causes rotation of the drum 40' via the worms 49 and the worm gear 48.

After a short rotary movement of the drum 40' and due to the provision of the rolls 44 and the couplings 45 the magnus rotors 1x with their coupling pieces 42 are drawn out from the recesses 11a at the planetary wheels 11 so that the rotation of the rotors is stopped. During continuous rotation of the drums 40' the magnus rotors 1x are completely wound onto the drum. The winding off of the rotors 1x can occur automatically under the influence of the centrifugal forces which act on the rotors after the connection between the drum 40' and the worm and spur gears is released by opening the couplings 55.

In a further modification of the invention, as indicated in FIG. 11, each of the drums 40' is driven by a respective electromotor which also causes the rotation of the drums via a worm gear. The shaft 50 which carries the worm gear 59 is coupled with an electromotor 56 for right-hand and left-hand drive. Electromotor 56 is flanged at the upper side of one of the arms 41. The motor 56 drives via the worm 49 and the worm 48 the drum 40' in one direction or the other. The advantage of this drive over that indicated in FIGS. 7 to 10 is that the magnus rotors are not permitted to run out under the action of the centrifugal force acting on the weight 8 alone but under the guidance of the electromotor 56. In this manner a tearing off of the magnus rotors from the coupling pieces 42 or carrying away from the weights 8 at the end is prevented.

A retraction and winding device with the above features is very important for rotors which are formed by a number of links or elements with the individual links being connected by coupling pieces. The embodiment indicated in FIG. 11 may be modified by placing the electric motor 56 below the retraction and winding drum 40'. In FIG. 12, the motor 56 which co-rotates with the part 3' is in meshing engagement via a pinion 57 with the inner gearing of the rotatably mounted gear wheel 59. Pinion 57 is mounted on the motor shaft and the gear wheel 59 is mounted on the bearings 58 on the rotational element 3'.

The outer gearing of the gear wheel 59 meshes with a pinion 51 which is mounted on a shaft 50. In this embodiment, the same as in the embodiment of FIGS. 7 to 10, when the rotors 1x are moved in or out the gear wheel 59 having an inner and outer gearing runs or co-rotates with the rotating part 3' due to the fact that it is taken along by the pinion 51. When the magnus rotor 1x is to be retracted, the gear wheel 59 is to be imparted with the relative movement relative to the rotary portion 3' which is caused by the pinion 47 of the operating motor 56. In this manner and via the pinion 51 the worm 49 and the worm wheel 48, the drum 40' is caused to rotate. The motor is used for right-hand and left-hand rotation. Then in the arrangement of FIG. 12, the magnus rotors may be moved out and moved in the same advantageous manner as in the embodiment of FIG. 11.

Independent of the manner in which the retracting and winding devices of the embodiments of FIGS. 6 to 12 are constructed and used in connection with the inventive magnus rotor construction, it is further provided that the winding drive for the drums 9 or 40 or 40' is automatically switchable only after a sufficient flying speed has been attained in order to cause the uplift of the aircraft by the wings. This, in turn, permits the pilot to handle additional instruments and he does not have to worry that the rotors are not retracted in the critical transition stage from the forward starting to the vertical flight at a time at which the forward flight is not sufficient to sustain the flight of the aircraft, for example.

While specific embodiments of the invention have been illustrated and described to illustrate the application of the inventive principles, it will be understood that this invention may be embodied otherwise without departing from such principles.

The expression "bending slack material" as used in the present application comprises all materials which do not offer any resistance when bending a bar-shaped body transverse to longitudinal axis. A material showing a typically "bending slack" behaviour is for instance a rubber hose.

The expression "bending slack," however, does not only refer to the behaviour of certain materials, but can also refere to "bending slack" components, being formed by a suitable arrangement of "non-bending slack" materials. An example for this case is a wire rope.

Within the scope of the present application the expression "bending slack" refers to a magnus rotor being composed of several short components. Though the individual components consist of a solid and stiff material, the "bending slackness" of the rotor assembly, however, is guaranteed by the jointed connection of the individual components.

"Bending slack" might be called a material which shows elastic properties in the case of a rod-shaped extension when a rod acts transverse to its rod axis, spring steel and fibre glass being mentioned only as examples for materials of especially good bending elasticity.

What is claimed is:

1. A rotor construction for an aircraft, comprising a rotatable rotor head, a plurality of bendable rotor elements carried by said head, said rotor elements being statically limp rotating bodies of revolution, means on said head to wind said rotor elements thereon, means to rotate said rotor elements about their longitudinal axes continuously during rotation of said rotor head, and means to rotate said head, said rotor elements being capable of being extended outwardly from said rotor and being retractable for winding on said winding means.

2. A rotor for an aircraft comprising a rotatable rotor head, means on said rotor head for winding a rotor element thereon carried by said head, a rotor element connected to said rotor winding means being a statically limp rotating body of revolution and being capable of extending outwardly from said rotor when in an operative position and of being wound on said rotor winding means, means to rotate said rotor head and means connected to said head for rotating said rotor element continuously during rotation of said rotor head.

3. A rotor according to claim 2, wherein said means for rotating said rotor element includes a bevel gear, and means coupling said bevel gear to said rotor element when the latter is in an operative position.

4. A rotor according to claim 2, wherein said means for rotating said rotor element includes gear means connected to said head and to said rotor element, and means for coupling and decoupling said gear means.

5. A rotor according to claim 4, wherein said gear means includes a pair of mating gears, one of which is freely rotatable on said rotor head, and means for braking said freely rotatable gear to cause relative rotation of said mating gears and rotation of said rotor blade element.

6. A rotor according to claim 2, wherein said means for rotating said rotor elements includes a rotatable element connected to said rotor head for rotation therewith, and coupling means on said rotatable element and said rotor element effective to connect said rotor element to said rotating means for rotation therewith when said rotor element is fully extended.

7. A rotor according to claim 6, wherein said coupling means include a conically shaped member formed on said rotor element at the inner end thereof, said rotatable element having a complementary conical recess, said rotor being movable under centrifgual force to cause said conical member to engage in the recess for rotation of said rotor element with said rotating member.

8. A rotor according to claim 2, wherein said rotor element carries a weight at the end thereof to urge said element outwardly under centrifugal force when said rotor head is operating and wherein said means for rotating said rotor elements includes coupling means on said element effective when said element is in fully extended position.

9. A rotor according to claim 2, wherein said means on said rotor for winding said rotor element thereon includes a drum mounted for rotation about an axis concentric with said rotor head axis.

10. A rotor according to claim 2, wherein said means on said rotor head for winding a rotor element thereon includes a drum mounted for rotation about an axis substantially perpendicular to said rotor head axis.

11. A rotor constructed according to claim 2, wherein said rotor element is substantially cylindrical.

12. A rotor according to claim 2, wherein said rotor element is made up of a plurality of individual cylindrical elements connected together by connecting links, the elements being connected by said links for rotation together but being bendable in relation to each other.

13. A rotor according to claim 2, wherein said rotor element includes a bendable element having a plurality of radially extending loop reinforcing members therein.

14. A rotor according to claim 13, wherein said rotor element includes a central rope element, said reinforcing loop elements connected to said central rope element.

15. A rotor according to claim 2, wherein said rotor element is made of a hollow cylindrical member.

16. A rotor according to claim 2, wherein said rotor element is covered by flexible material.

17. A rotor element according to claim 2, wherein said rotor is made of a plurality of interconnected cylindrical elements and a covering extending over said elements.

18. A rotor according to claim 2, wherein said means on said rotor for winding a rotor element therein includes a rotatable sleeve member, a drum secured to said sleeve member for rotation therewith, drive means connected to said sleeve member for rotating said sleeve member, said sleeve member having an outwardly extending arm portion, a bevel gear rotatably mounted on said arm portion, a sun gear in meshing engagement with said bevel gear and concentrically and rotatably mounted on said sleeve member, a magnus rotor connected to said bevel gear for rotation therewith, and means for braking said sun gear to cause relative motion between said sun gear and said bevel gear to effect rotation of said rotor element.

19. A rotor according to claim 18, including a fork member rotatable on said sleeve member and having a guiding portion extending around said rotor element and means for braking said fork member for effecting winding and unwinding of said rotor element about said rotor.

20. A rotor according to claim 19, including a drum connected to said sleeve member and rotatable therewith and having a portion extending outwardly beyond said bevel gear through which said rotor element extends, said fork member being effective to wind said rotor element around said drum.

21. A rotor according to claim 18, including means pivotally supporting said rotor for retraction into the fuselage of an aircraft and for positioning above said fuselage.

22. A rotor according to claim 18, wherein said rotor element includes friction coupling means engageable with said bevel gear.

23. A rotor according to claim 18, wherein said rotor element includes a weight at the outer end thereof, urging said rotor into an outstretched condition during rotation of said rotor, and coupling means on said rotor element engageable with said bevel gear when said rotor element is in a fully extended operative position.

24. A rotor according to claim 18, including a winding drum mounted on said sleeve member, motor means for rotating said winding drum, said rotor elements being connected to said winding drum for winding thereon and for permitting taking out thereof.

25. A rotor according to claim 18, including ratchet means for locking said sun gear against rotation to effect rotation of said bevel gears.

26. A rotor according to claim 18, including a drum rotatably mounted on said sleeve member, and gear means connected between said drum and said sleeve member for effecting rotation of said drum during the rotation of said sleeve member.

27. A rotor according to claim 26, wherein said gear means includes ratchet means for rendering said gear means ineffective.

28. A rotor according to claim 26, wherein said gear means includes means for disconnecting said drum from said sleeve member.

29. A helicpoter rotor construction comprising a rotatable hollow sleeve having a plurality of outwardly extending arms thereon in a number corresponding to the number of blade elements, a bevel planetary gear mounted at the end of each of said arms, a sun gear having a central portion rotatable within and concentrically to said sleeve member and having teeth in meshing engagement with each of said planetary gears, a magnus rotor blade element connected to each of the planetary gears, said magnus rotor blade elements being statically limp and being bendable for winding into a coil, winding drum means adjacent said sleeve connected to said rotor blade elements for winding said elements thereon when in an inoperative position, means for rotating said sleeve member, and means for braking said sun gear to cause rotation of said planetary gears and rotation of said rotor elements.

30. A rotor according to claim 29, wherein said winding drum means includes a drum secured to said sleeve member having side portions extending upwardly exteriorly of said bevel gears with an opening therein to accommodate each of said rotor elements.

31. In a rotor according to claim 29, including a drum for each of said rotor elements rotatably mounted on said sleeve member and connected to a respective one of said rotor elements, and means for rotating said drum.

32. A rotor according to claim 31, wherein means for rotating said drum includes gear means connected between said drum and said sleeve member.

33. A rotor according to claim 32, wherein said gear means includes pawl means for rendering said gear means ineffective.

34. A rotor according to claim 31, wherein means for rotating said drum includes separate electric motor means.

35. A rotor according to claim 29, wherein said rotor elements include frictional coupling means thereon engageable with said bevel gears when said rotor elements are fully extended during rotation of said rotors.

36. A magnus rotor element construction comprising a cylindrical statically limp rotatable member capable of being bent and wound into a coil on a drum and a weight carried at the end of said member.

37. A magnus rotor element construction according to claim 36, wherein said rotor element is made up of a plurality of substantially rigid individual elements, and link members connecting said individual elements together.

38. A rotor element according to claim 37, wherein said link elements permit relative bending of said rigid elements but connect said rigid elements for rotation together.

39. A rotor element according to claim 37, including a cover over said elements.

40. A rotor element according to claim 37, including a central rope member formed at the interior of said rotor elements and a plurality of loop-shaped reinforcing elements connected to said rope member.

41. A rotor element according to claim 29, having a hollow interior and a reinforcing covering thereover.

42. A rotor element according to claim 29, including an elastic covering over said elements.

43. A rotor for an aircraft comprising a rotatable rotor head, and a bendable rotor element carried by said head and extending outwardly therefrom, said rotor element being of substantially cylindrical configuration and being statically limp and being capable of being wound into a coil for storage within said head, and means for continuously rotating said rotor element about its longitudinal axis during rotation of said head.

References Cited in the file of this patent

UNITED STATES PATENTS

| | | |
|---|---|---|
| 1,311,389 | Guest | July 29, 1919 |
| 1,698,819 | Massey | Jan. 15, 1929 |
| 2,172,333 | Theodorsen | Sept. 5, 1939 |
| 2,172,334 | Theodorsen | Sept. 5, 1939 |
| 2,226,978 | Pescara | Dec. 31, 1940 |
| 2,330,803 | Andrews | Oct. 5, 1943 |
| 2,520,268 | Avery | Aug. 29, 1950 |
| 3,065,799 | McCarty | Nov. 27, 1962 |

FOREIGN PATENTS

| | | |
|---|---|---|
| 1,033,039 | Germany | June 26, 1958 |
| 250,636 | Great Britain | Apr. 15, 1926 |
| 584,224 | Italy | Oct. 24, 1958 |